(12) United States Patent
Mauger et al.

(10) Patent No.: US 6,480,495 B1
(45) Date of Patent: Nov. 12, 2002

(54) CONNECTIONLESS COMMUNICATIONS NETWORK

(75) Inventors: Roy Harold Mauger, Herts (GB); Simon Daniel Brueckheimer, London (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/380,173

(22) PCT Filed: Apr. 17, 1998

(86) PCT No.: PCT/GB98/01142

§ 371 (c)(1),
(2), (4) Date: Aug. 26, 1999

(87) PCT Pub. No.: WO98/48593

PCT Pub. Date: Oct. 29, 1998

(30) Foreign Application Priority Data

Apr. 18, 1997 (GB) .............................................. 9707832
Aug. 1, 1997 (GB) .............................................. 9716331

(51) Int. Cl.⁷ .............................................. H04L 12/56
(52) U.S. Cl. .................................. 370/395.65; 370/316
(58) Field of Search ....................... 370/395.43, 395.41, 370/395.21, 474, 389, 316, 476, 395.5, 395.52, 395.65; 455/428, 422, 427, 431

(56) References Cited

U.S. PATENT DOCUMENTS 5,826,169 A * 10/1998 Natarajan ................... 455/13.1
6,137,798 A * 10/2000 Nishihara et al. ........... 370/392
6,178,169 B1 * 1/2001 Hoogkinson et al. ....... 370/395
6,310,893 B1 * 10/2001 Yuan et al. ................. 370/474

FOREIGN PATENT DOCUMENTS

EP    0 748 142    12/1996
GB    772322 A2 *  5/1997  ........... H04L/12/56

OTHER PUBLICATIONS

Mauger, "QoS Guarantees for Multimedia Services on a TDMA–Based Satellite Network", IEEE Communications Magazine, vol. 35, No. 7, Jul. 1997, pp. 56–58, 63.
Werner, "ATM–Based Routing in LEO/MEO Satellite Networks with Intersatellite Links", IEEE Journal on Selected Communications, vol. 15, No. 1, Jan. 1997, pp. 69–82.
Mankarious, "A Full Mesh Asynchronous Transfer Mode (ATM) Satellite Communcations Network", Proceedings of MILCOM, vol. 1, Nov. 6, 1995, pp. 11–15.
Tasaka, "Links–Level Connection Control Schemes in a High–Speed in a High–Speed Satellite Data Network: A Performance Comparison", IEEE Journal Communications, vol. 10, No. 2, Feb. 2, 1992, pp. 437–446.

* cited by examiner

Primary Examiner—Douglas Olms
Assistant Examiner—Ken Vanderpaye
(74) Attorney, Agent, or Firm—Lee, Mann, Smith, McWilliams, Sweeney & Ohlson

(57) ABSTRACT

A non-geostationary satellite connection-less network incorporates a plurality of satellite nodes and ground stations in communication with the nodes. The network is modeled by the corresponding virtual model network. In the virtual network, connections between users are available between virtual nodes and are made according to a restricted set of routing plans based on the modeled virtual paths between those nodes. The virtual model provides a means of determining admission of connection-orientated calls of different quality of service (QoS) traffic class requirements into the network with engineered grade of service (GoS) and QoS guarantees.

8 Claims, 10 Drawing Sheets

Connection Control view

CONNECTIONLESS COMMUNICATIONS NETWORK

This invention relates to a connectionless communication network and in particular to an arrangement and method for providing communication in a network structure comprising a ground network and satellite links.

BACKGROUND OF THE INVENTION

Satellite communications systems employing geostationary satellites carrying traffic between ground stations are well established. Although such systems are effective in operation, they suffer from two limitations. Firstly, a geostationary satellite occupies an equatorial orbit and thus its 'footprint' may not extend to higher latitudes. Secondly, a large number of geostationary satellites have already been installed and there are now very few orbital positions available for new satellites. To address these problems, there are recent proposals to provide satellite systems in which non-geostationary satellite nodes co-operate with a ground-based network to form a global communications system.

A method of providing communications in a system employing non-geostationary satellites is described in specification U.S. Pat. No. 5,621,415. In that arrangement, the satellite footprints are partitioned into linear spanning cells containing multiple linear segments to reduce the hand-off overhead.

Our co-pending United Kingdom patent application No 9707832.3 (Rosenberg 1) filed Apr. 18, 1997 and our co-pending application (ref.ID0799) of even date relate to a connectionless communications network for transporting broad band services requiring quality of service (QoS) guarantees and for ensuring that the service maintains the quality of service determined at the start of a communication session throughout the duration of that session. In those applications, moving satellite nodes are accommodated by maintaining a virtual model of the network having fixed virtual nodes to control packet routing. Routing of packets is performed with reference to the virtual network. By ensuring that topology changes re-establish the bandwidth available within the virtual model, the system provides a guaranteed quality of service A method of operating an ATM network by using a software representation comprising a virtual network model is described in specification No. EP-A-748142. A description of ATM-based routing in LEO/MEO satellite networks is given by M Werner et al. in IEEE Journal on Selected areas in Communications, Vol. 15, No. 1, January 1997, pages 69–82.

Connectionless network operation has been traditionally used in data communications. Networks based on the Internet Protocol (IP) are typically connectionless. Wireless and satellite data networks are often designed for connectionless operation in order to avoid the need for explicit connection hand-overs due to the physical mobility of users or systems. The main features of a connectionless network are not to require a connection set-up phase and to route each packet of a connection independently. No connection related state is then needed in network switches and a topological change in a node (i.e., its failure or its hand-over in satellite networks) only necessitates the update of the routing table contained in its neighbours. In a satellite network, connectionless operation removes the need for connection related states to be held in the sky segment, but the advantages of statelessness must be weighed against the effects on routing and congestion management. With regard to routing, each packet of information is self-routed, so the network is able to adapt to changes due to hand-overs between satellites. Each hand-over can be interpreted as a change of topology.

Transport of broadband services requiring Quality of Service (QoS) guarantees over connectionless network is a major issue since traditionally this kind of network has only offered best-effort services. QoS guarantees are usually provided through connection-orientation and call admission control, as in the case of B-ISDN networks based on ATM. For such networks a virtual circuit is established during a set-up phase, and then routing of individual packets is simplified (i.e., no decision needs to be made) since the route (i.e., the virtual circuit) has already been chosen, and a certain amount of resource such as buffer allocation and bandwidth has been reserved.

In a network that has a wide service application spectrum, traffic may be segregated on the basis of a class of QoS criteria rather than transport protocol or mode. Even with such a segregation the QoS classes may be broad and quite different. In that case, there is always a trade-off between connection-orientation and connectionless operation, the key considerations being the need for a call set-up phase, the amount of processing per packet, the necessity to keep connection related state in the switches involved in the connection, meeting QoS guarantees, the need for end-to-end sequence guarantee, and the need to perform a new connection set-up phase for any topological change involving a node in the route.

This last point is crucial for a LEO based satellite network where topological changes are very frequent. Our co-pending applications referred to above describe methods for maintaining connection-oriented communication and bandwidth availability when the topology changes, without requiring a connection-oriented function or state within the network. In a preferred embodiment, a fixed virtual model of the network is maintained and a physical node embodies a virtual node that is fixed relative to the ground.

SUMMARY OF THE INVENTION

An object of the invention is to provide an improved method of operating a connectionless network to accommodate various grades of quality of service (QoS).

This invention relates to a method for applying those techniques to the several different QoS classes described below and for admitting traffic of all QoS classes into an integrated service connectionless network.

One aspect of this invention is a method to admit connection-orientated calls of different Quality of Service (QoS) traffic class requirements into a connectionless network with engineered Grade of Service (GoS) and QoS guarantees.

Another aspect of this invention is a method to manage congestion and QoS requirements of connectionless sessions in a connection-less network.

A further aspect of this invention is the combination of reserved and on-demand bandwidth allocation to different traffic QoS classes in a network using TDMA access.

A further aspect of this invention is mechanism that allows TDMA satellite networks to remain stateless, by providing mechanisms that relate to call state and admission control and congestion management to reside on the ground.

The invention further provides a means for call admission control and connection management in such a preferred embodiment, and includes the alternative embodiments where the user network interface may be ATM, PDH or SDH based.

In a further aspect, the invention provides a connectionless network having means for accommodating a plurality of different quality of service (QoS) traffic class requirements, the network having means for allocating reserved access bandwidth to traffic in a first group of quality of service classes, and means for allocating on-demand access bandwidth to traffic in a second group of quality of service classes.

BRIEF DESCRIPTION OF THE DRAWINGS

An embodiment of the invention will now be described with reference to the accompanying drawings in which.

DESCRIPTION OF PREFERRED EMBODIMENT

Figure 1:
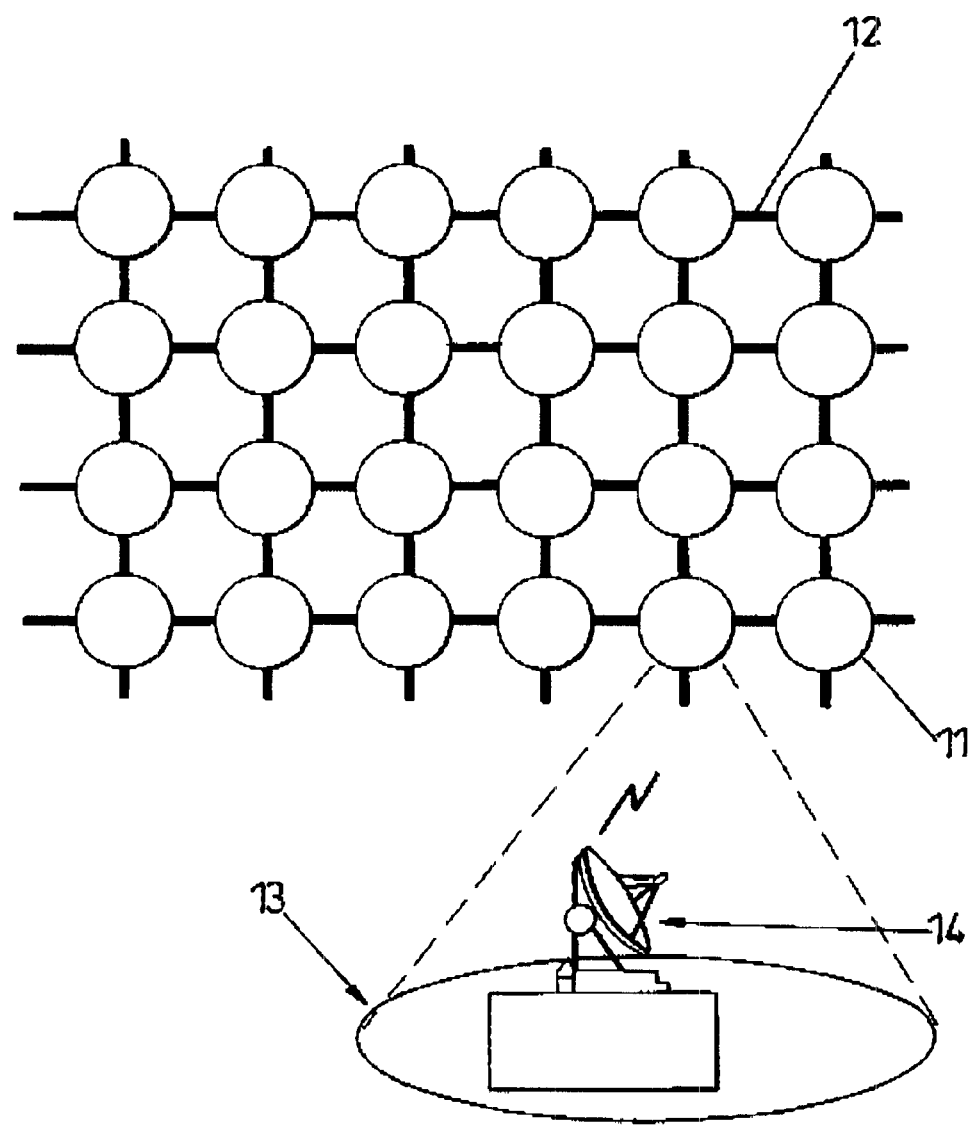
FIG. 1 is a schematic diagram of a satellite network according to a preferred embodiment of the invention.

Referring first to FIG. 1, the network comprises an array of non-geostationary satellites 11 interconnected by inter-satellite communications links 12 between adjacent satellites. These inter-satellite links will typically comprise microwave links carrying a number of communication channels. Typically, the satellites will be low earth orbit (LEO) satellites. The ground portion of the network is partitioned into a number of cells 13 each corresponding to the footprint of a satellite and each containing one or more ground stations 14. The satellites 11 communicate with the ground stations 14, typically via microwave links, and provide the nodes of a communications network in which communications traffic is routed from ground station to ground station via one or more satellites which thus form the nodes of the network. Operation of the system is controlled via one or more network controllers 16.

It will be appreciated that although FIG. 1 depicts a regular array of satellites, this, in the case of non-geostationary satellite systems, is a highly idealised 'snap-shot' view of the system as the satellites will be constantly in motion relative to the ground and to each other so that the network topology will be constantly changing. However, the satellite orbits and the corresponding topology changes are predictable in the short and medium term. In general, the prediction of the satellite motion and positions will be determined from a reference model which is updated from time to time from measurements of the satellite positions. Routing of traffic within this topologically changing network is determined by the use of a ground-based modelled or virtual network as will be described below.

The network of FIG. 1 is adapted to handle a wide variety of types of traffic, these traffic types being divided into a number of quality of service (QoS) classes as will be discussed below.

Figure 2:
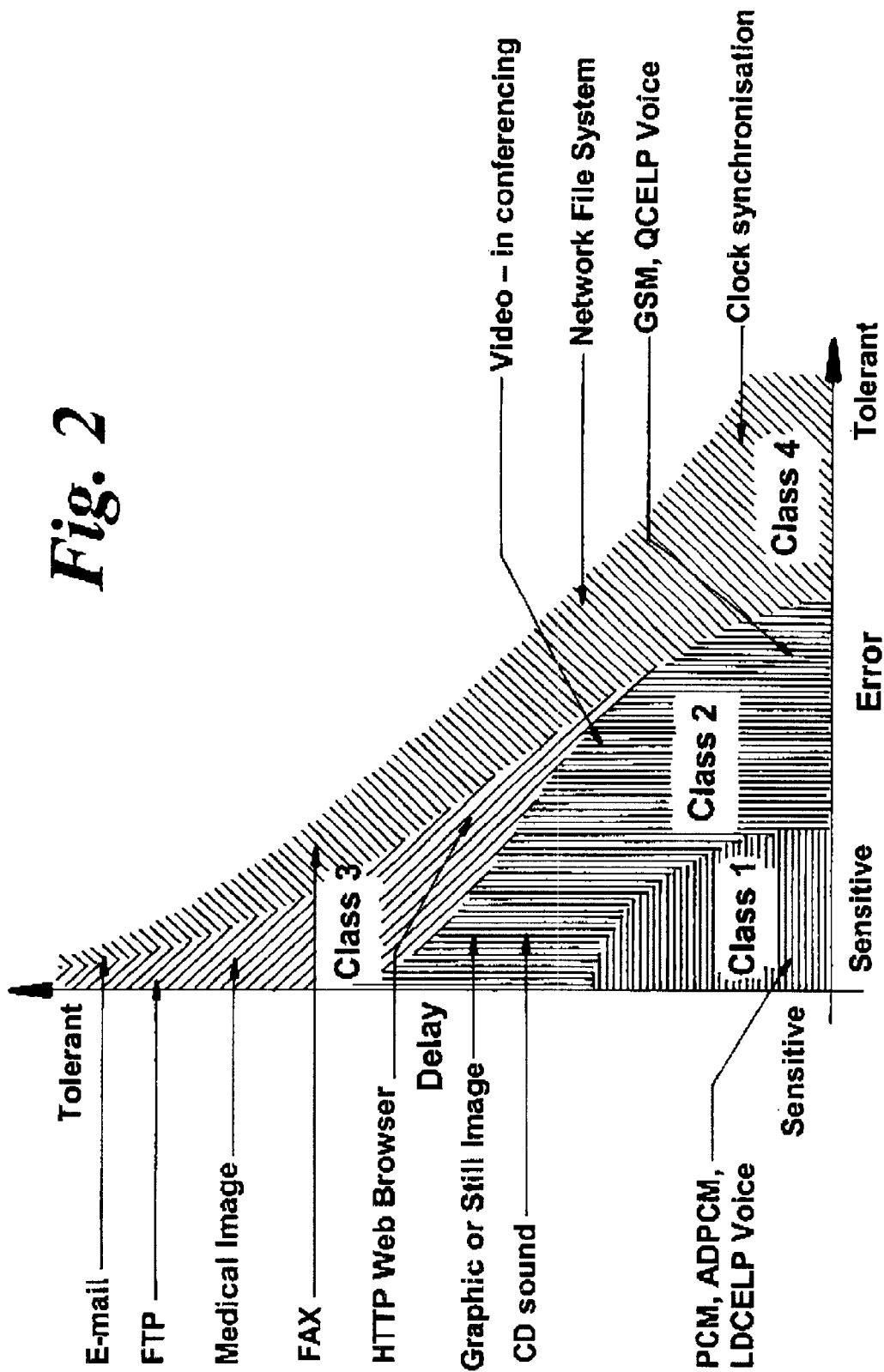
FIG. 2 illustrates an example of segregation of services into different classes of quality of service (QoS) criteria for traffic.

Referring now to FIG. 2, the different QoS classes illustrated can be supported and provided by different traffic priorities in a network. Those skilled in the art will appreciate that this is similar to the ITU-T and ATM Forum specifications for ATM technology in the B-ISDN model. With reference to those standards, the QoS classes are considered independent of the ATM transfer capability (CBR, DBR, SBR, VBR, ABR, etc.), just as applications that use TCP or UDP (RTP) could actually demand different QoS classes of the network. We also draw attention to the definition of Grade of Service (GOS), which is distinct from QoS, and describes how calls or connections of certain QoS class get admitted to the network, if at all. QoS describes performance once a call has been admitted to the network.

By way of example to illustrate the operation of the network we consider four QoS classes based on the ITU-T and ATM Forum definitions, although the means is not restricted in anyway to this number or their definitions.

QoS class 1 is a stringent traffic class, because there are guarantees for delay, jitter and loss. Examples of this service class are PCM voice, compressed voice codecs developed for wire-line applications in which the error incidence has been assumed to be low, and video codecs that have high compression ratios. This is shown in FIG. 2. All these services are call-based inasmuch that they demand immediate human consumption, and hence a low delay of less than the ITU-T G114 figure of 150 ms for voice. Moreover a stable route must be maintained. Many of the class 1 services that use this model are phase sensitive, and any change in the established end-to-end delay will disrupt the communication and relative synchronization.

QoS class 2 is a tolerant traffic class, because there is not necessarily a stringent requirement on delay, jitter or error, but it is generally expected that these properties can be negotiated for the particular service at connection set-up. Services using class 2 may tolerate higher delay and/or error incidence than the stringent class 1, because of a need for looser bit-rate specification which may vary within pre-set bounds. Services at the delay sensitive end of the class 2 spectrum are error-tolerant voice codecs that can mitigate higher error ratios than would normally be expected in wire-line applications such as GSM. Services at the error-sensitive end of the spectrum are for example data-based as part of interactive conferences such as still graphics, slides, document paging and pointing. These services involve human interaction, so they are call-based. A stable route must be maintained since, although not predominantly phase sensitive, the services jitter allowance may be small at the delay-sensitive end of the spectrum, and traffic shaping mechanisms may be in use at receive buffers.

QoS class 3 is a guaranteed delivery traffic class for which the delay and jitter values are sacrificed for a high probability or close to assured delivery. This is achieved by flow control in which a priori there is no guarantee when a cell will be delivered, only that, if once admitted to the network, then it will be delivered with a high probability of success. Example services in this class are medical image or general file transfer, electronic mail and fax. Class 3 services may or may not be human interactive, in the sense that responsiveness may or may not be required. To that extent the services are not necessarily call-based, but are usually session or stream-based, and therefore connection-orientated. However, this is not always a specific requirement. During a significant connection or session duration the traffic is fully or partially flow-controlled to ensure delivery without having to over-provide bandwidth. In a short transaction, connection-orientation and flow control may not be necessary, since full retransmission is viable.

QoS class 4 is a non-guaranteed delivery traffic class, for which no bounds on delay, jitter or error incidence are specified, nor are they expected to be negotiable. The network may admit the traffic but makes no contract that the cell will be delivered. The goal is to sacrifice delay for some degree of delivery assurance, or complete loss. Services that could use this class are hotly debated in ATM circles, but bearing in mind that the application performs the error/loss mitigation, some possible examples are client-server backup, network clock synchronisation, and the "best-effort" Internet protocol in general, where the service application does not require a significant QoS guarantee. Delay will be in fact bounded by implementation. If a cell is not lost due to congestion it can only be delayed worst-case by the accrued maximum buffer length in the switching nodes it has traversed. The services using this class do not have to be connection-orientated or call based.

Our co-pending applications referred to above describe a network model in which connection-orientation and reservation may be maintained in a connectionless network, the preferred embodiment being a connectionless LEO satellite network in which the satellites are moving, and therefore there are topology changes. The preferred embodiment described herein is a modelled virtual path that describes the community-of-interest between endpoints held in a virtual model in preferentially ground-based connection control.

Figure 3:
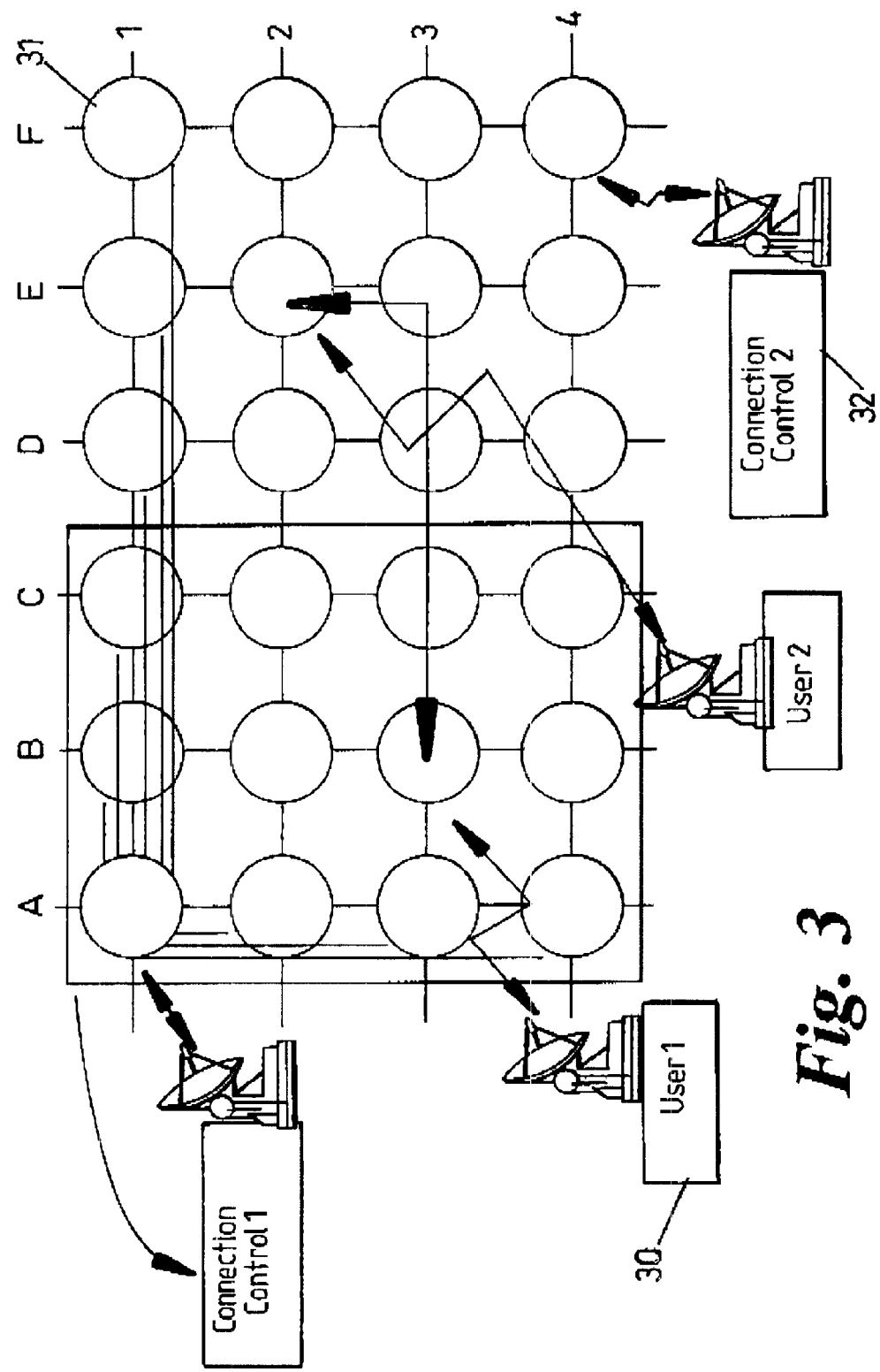
FIG. 3 illustrates the principle of a virtual model as applied to the satellite network of FIG. 1.
Figure 4:
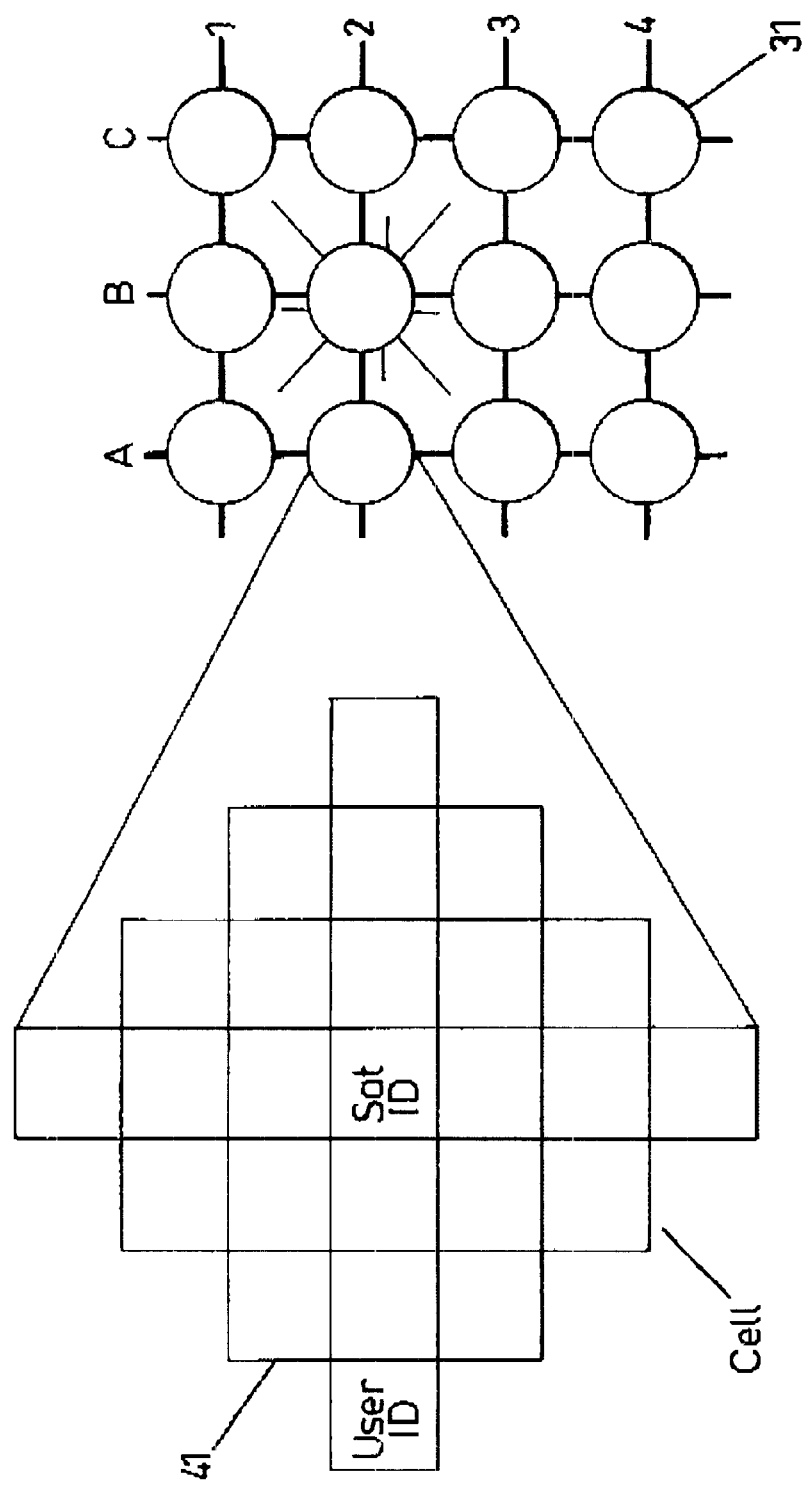
FIG. 4 illustrates in schematic form the relationship between the virtual model of FIG. 3 and the corresponding real satellite network.
Figure 5A:
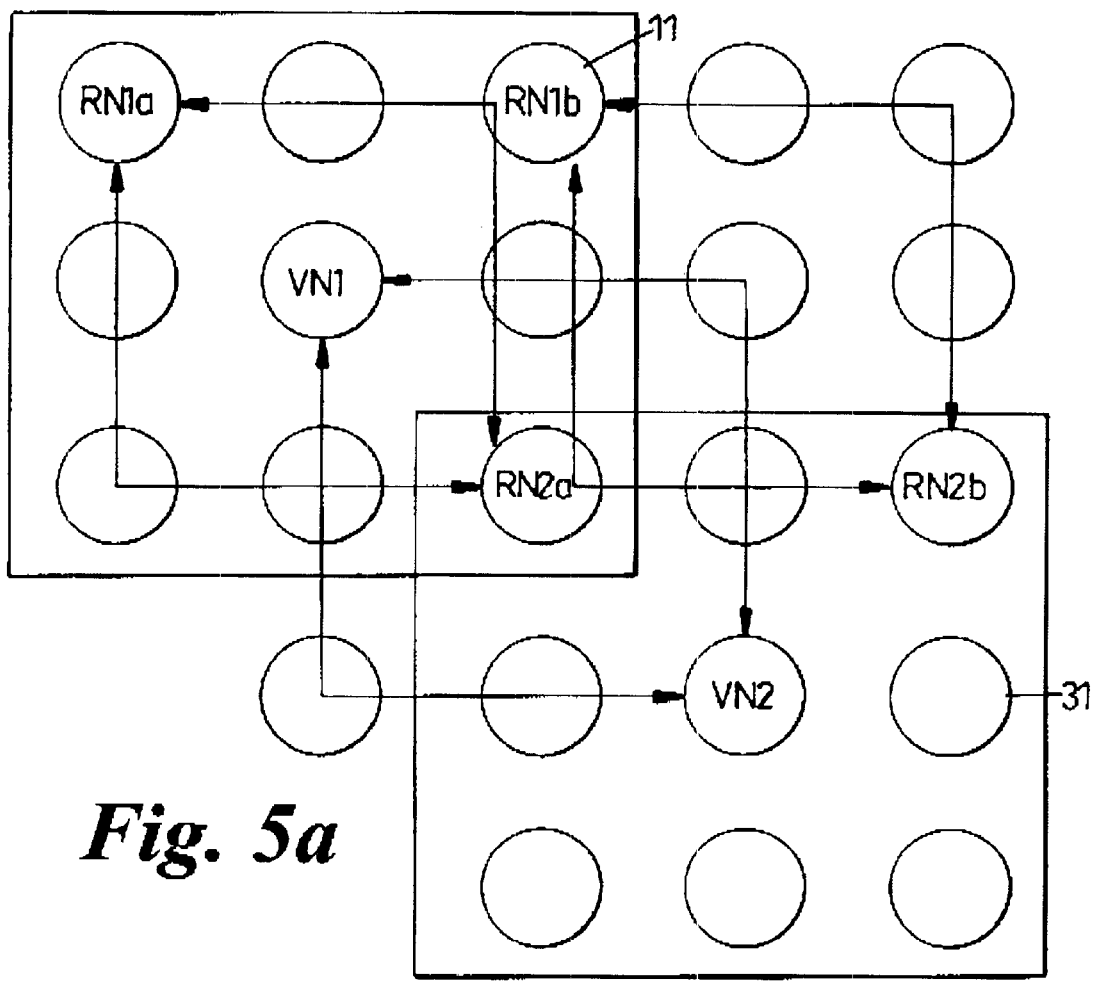
FIG. 5 illustrates the principle of a modelled virtual path employed in the virtual model of FIG. 3.
Figure 5B:
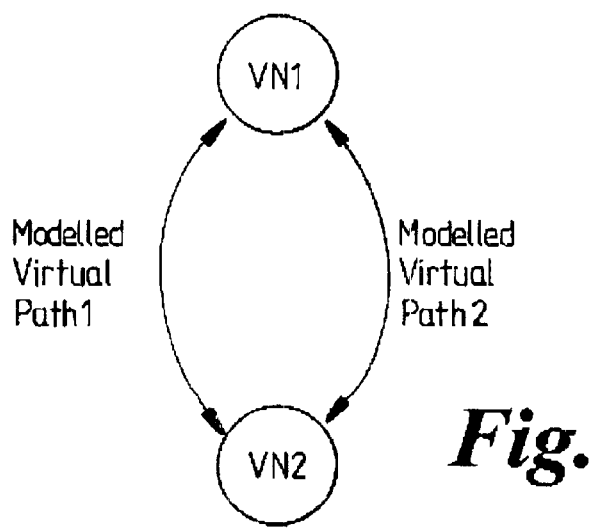

The network of FIG. 1 is modelled by the corresponding virtual model network shown in FIG. 3. In the virtual network of FIG. 3, connections between users 30 are available between virtual nodes 31 and are made according to a restricted set of routing plans based on the modelled virtual paths between those nodes. This is illustrated in FIG. 3 which illustrates the use of ground-based connection control 32 and FIG. 4 which illustrates the relationship between the real satellite network and the ground-based virtual model. As shown in FIG. 4, the ground-based model provides a fixed mapping between a set of cells and a modelled virtual node. Hand-over of cells means that modelled nodes may be distributed over up to nine satellites. Ownership of a particular cell 41 identifies a satellite node as embodying the ground-based model of that virtual node. Ownership of cells is broadcast to all adjacent nodes so that the location is visible from the satellite embodying the ground image. The example shown by way of illustration in FIG. 3 is of a "dogleg" or angular connection. In order to support these routing plans, a mesh of virtual connections may link all satellites according to a certain topology. For a network with a small number of satellites a full mesh would be provided. For a network with a larger number as illustrated here, the mesh could include all satellites within the same constellation and in addition a further mesh of virtual connections linking all satellites which form a line of latitude around the world. These routing plans appear in the model as modelled virtual paths of defined capacity or statistical capability. Each virtual node is connected to every other virtual node by means of a set of these modelled virtual paths. The capacity of the set of modelled virtual paths linking a pair of virtual nodes is determined by traffic analysis of the community of interest between the nodes and is subject to regular re-engineering as the network or its usage evolves. The relationship between the virtual and real networks is further illustrated in FIG. 5 which illustrates the principle of modelled virtual paths and shows the relationship between the real satellite nodes 11 and the corresponding virtual nodes 31 of the modelled network.

Figure 6:
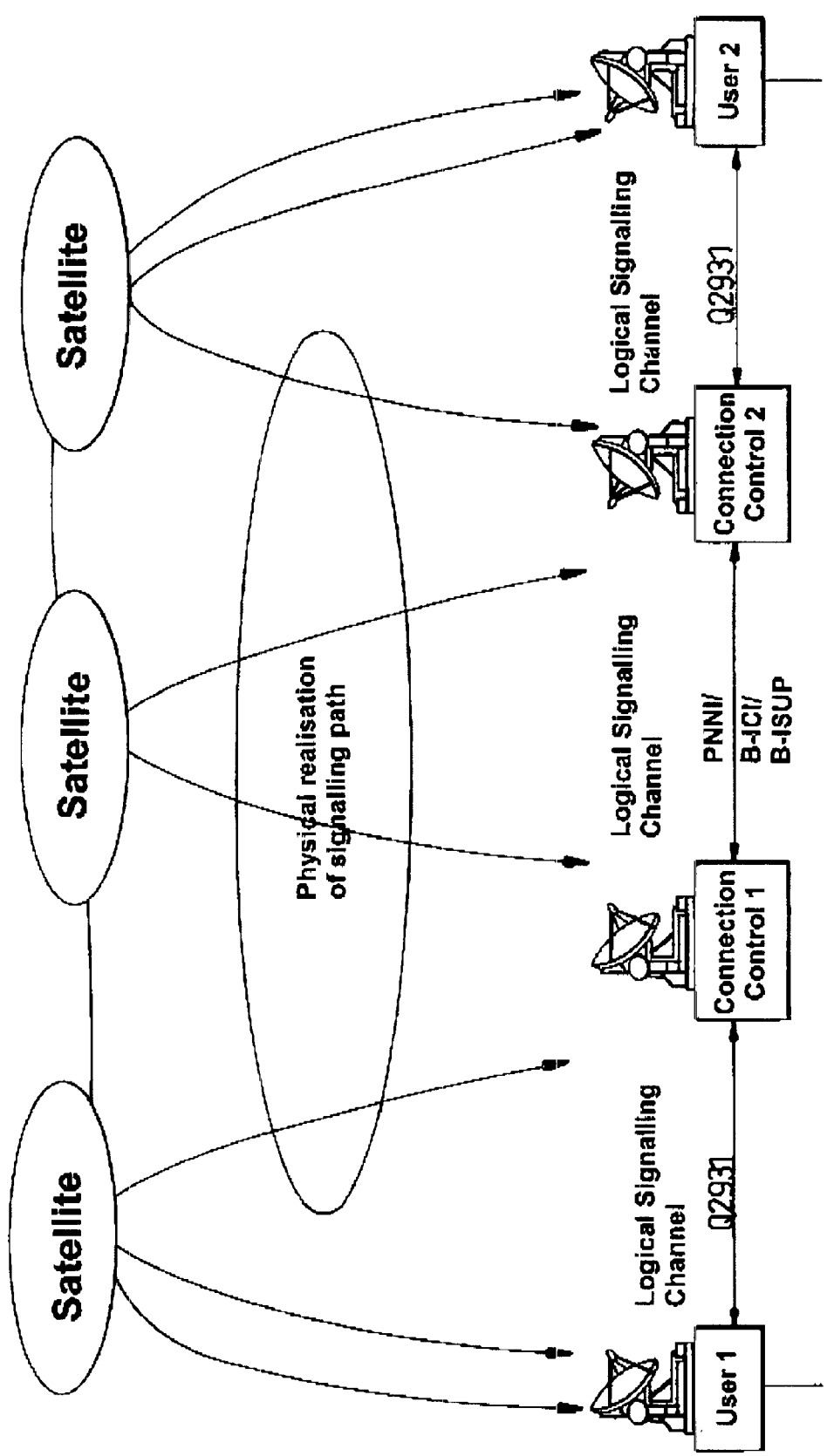
FIG. 6 illustrates a connection control function based on B-ISDN signalling employed in the network of FIG. 1.
Figure 7:
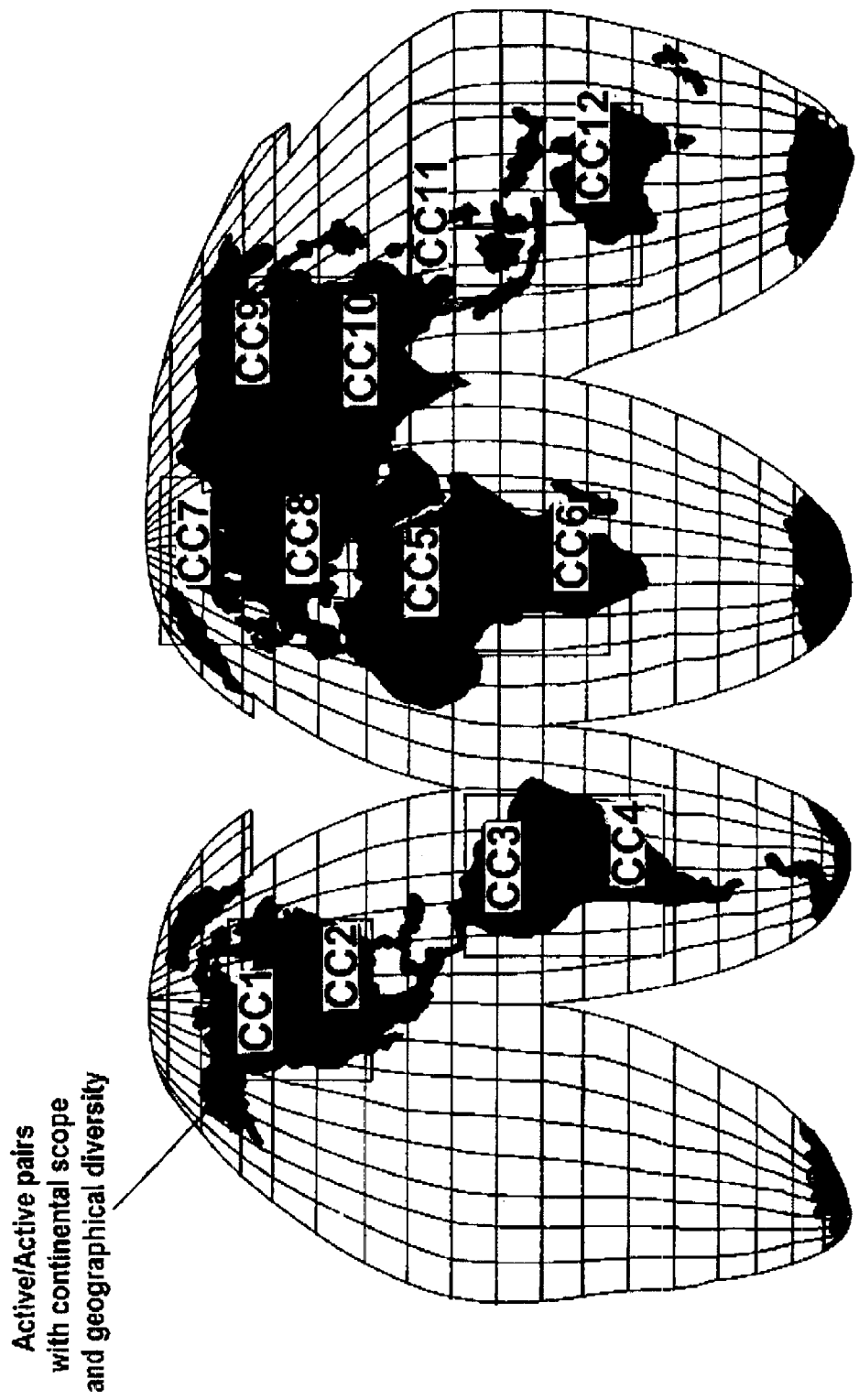
FIG. 7 illustrates a possible scoping or deployment of the connection control entities for the satellite network of FIG. 1.

The connection control function in the network of FIG. 1 is illustrated in FIG. 6. Each user 60 has a signalling link 62 to an allocated connection control (CC) 63 which models the part of the network within which that user resides. Connection control nodes are fully interconnected with semi-permanent signalling links 64, and a connection request is allocated capacity on a modelled virtual path which, as it is ATM like in its behaviour, allows the use of standard B-ISDN signalling between the connection control entities, this being illustrated in FIG. 6. Connection control entities are provided at a small number of physical locations and control connections using an object model of all allocable resources within their section of the network. Connection control functions can be centralised on a continental scale, for which scaling of computer capacity is not a problem by the use of object models. Furthermore if connection control entities are located in low demand traffic areas, then signalling traffic congestion is avoided. A possible scoping or deployment of the connection control function (CC) is illustrated, in FIG. 7. Most connections can be made with a pair-wise communication between two connection controls. Exceptionally, a third connection control can grant through capacity as a transit virtual connection.

Figure 8:
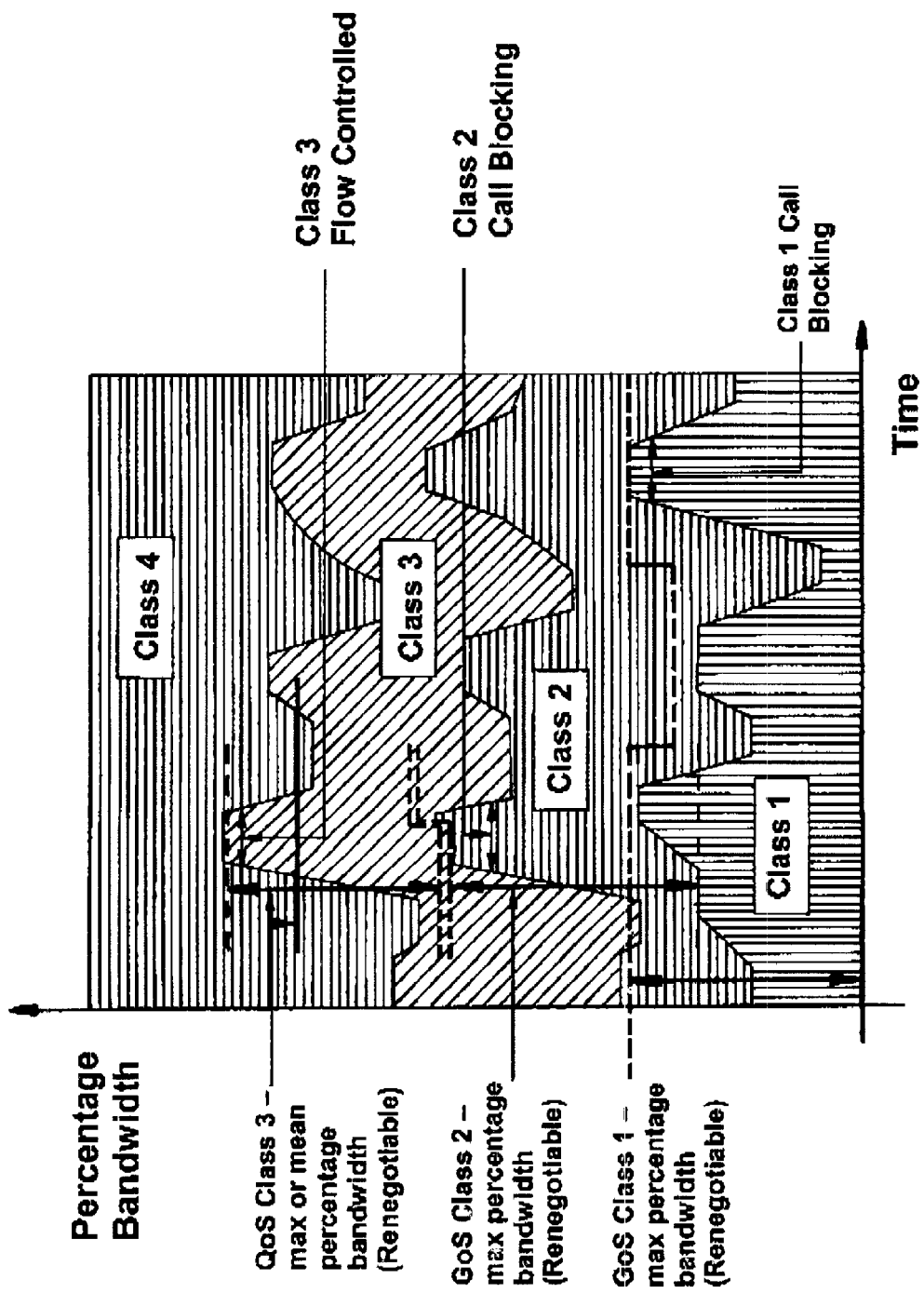
FIG. 8 illustrates a bandwidth and admission plan for the network of FIG. 1.

A typical QoS classes bandwidth and admission policy is illustrated in the diagram of FIG. 8. This figure illustrates a plan for bandwidth reservation for on-demand access and for the reservation of bandwidth in the core network as a basis for call admission control and congestion management. As shown in this figure, classes 1 and 2 use reserved access bandwidth. Call admission control (CAC) calculates the blocking probability based on the traffic shape/reshaping based on the calls in progress. Classes 3 and 4 use on-demand access bandwidth. Here, call admission control calculates mean or maximum effective bandwidth. Class 3 may in some applications have reserved bandwidth. The maximum/mean bandwidth values for classes 1, 2 and 3 can be recorded per cell and transferred to the corresponding satellite which keeps a running balance.

To satisfy the requirement for reservation of bandwidth and to ensure a stable route, QoS class 1 and 2 traffic must be connection-orientated. The modelled virtual path defined herein forms a basis on which the call admission control policies of the B-ISDN ATM model may be adapted to the admission of calls to the network of QoS class 1 and 2 defined herein. To ensure capacity is not over-subscribed, call admission control (CAC), provides a means of bandwidth accounting which is performed at connection set-up. The modelled virtual paths furthermore ensure that all traffic is routed in the same way in the virtual model such that only limited path-length change artefacts need be compensated, for example satellite hand-off. By assigning a higher traffic queue scheduling priority to class 1 services over class 2 services, and restricting these two classes to no alternative path routing during a call by virtue of the modelled virtual path, we have found that a connectionless network can satisfy all the criteria of QoS classes 1 and 2.

The CAC and the available capacities of the modelled virtual and physical paths controls the grade of service of the network. A given CAC responds to QoS class 1 and 2, and the selected transfer capability at call request, and determines from the available capacity (and functional boundary conditions) how many new calls can be admitted to the network. The accuracy of the CACs will contribute to the overall GoS and in part the realised QoS. If there is an abundance of Class 1 traffic calls, then the Class 1 and Class 2 CACs will admit fewer calls for a given remaining capacity shared between the classes. Essentially this call-blocking rate will depend at any moment on the utilisation and classes of all the established calls. It is not wrong to reject calls, but this can represent a poor GoS and the network preferably needs more capacity.

Using the above operation we now describe the treatment given to the full complement of the previously described QoS classes in a connectionless network, the preferred embodiment being a LEO satellite network. It will however be appreciated that the technique is not restricted to this number of QoS classes which may be subdivided e.g. by criteria, traffic queue scheduling priority, nor is the technique restricted to LEO satellite networks. Unlike QoS classes 1 and 2, QoS class 3 requires flow control to ensure delivery without over-provisioning resources. In a stateless satellite space-segment, where the definition of statelessness is defined to be holding no connection or bandwidth reservation details onboard a satellite, there is no facility to flow control traffic. QoS class 3 services use a transport protocol with a goal of delivering a stream of information intact, at the expense of delay. ATM available bit rate (ABR) transfer capability has a small loss probability, but if necessary this can be teased out by a light-weight higher protocol operating end to end. Both ABR and TCP (transport control protocol) transport protocols are connection-orientated and fully flow-controlled and attempt to establish QoS class 3 performance in their respective network contexts. ABR is based on credit or rate-based flow-control; cells are flow-controlled link-by-link. TCP by contrast uses end-to-end flow control.

To support ABR, the network would have to meet an almost certain delivery criterion once having admitted an ABR transfer capable ATM cell. Implementing link-by-link flow control as per ATM would violate the stateless criterion on board. Furthermore, link-by-link back-pressure alone in a connectionless space segment is likely to cause unwieldy re-sequencing requirements at a destination terminal, and is likely to impose large buffers throughout the network. Without any internal flow control mechanisms, a connectionless network there will have uncontrolled be packet loss when congested, and not meet the delivery criterion for this service QoS class.

Simply substituting the ABR link-by-link with end-to-end flow control, by essentially treating the network as one long link, requires accommodating significant round-trip delay, and requires a special priority for resource allocation cells that provide the credits in an ATM network. With this approach, the "passive" intermediate nodes (satellites) would have to ensure that merging traffic does not cause congestion and cell loss.

TCP's goal is higher than ATM's ABR transfer capability as it tolerates no packet loss. TCP is already based on end-to-end flow control. However, TCP actually has many different implementations. These vary widely in retransmission policies, time-out durations and back-off strategies. There is no easy way to contain or manage the traffic in terms of the number or spread of users, and since any error incidence provokes a retransmission. Consequently the network is exposed to unmanageable congestion and this will impact the QoS of classes 1 and 2.

Dynamic routing policy decisions can smooth traffic but not contain it. The MAC layer of TDMA access policy is insufficient to contain traffic either over a distributed network, since at some point, not necessarily distant, congestion will occur where traffic merges. Furthermore, if the MAC protocol is shaping traffic, then TCP may have to be modified to account for this local flow-control, and if the flow control is applied too rigorously, throughput will suffer due to carrying both redundant packets and their retransmission.

Figure 9:
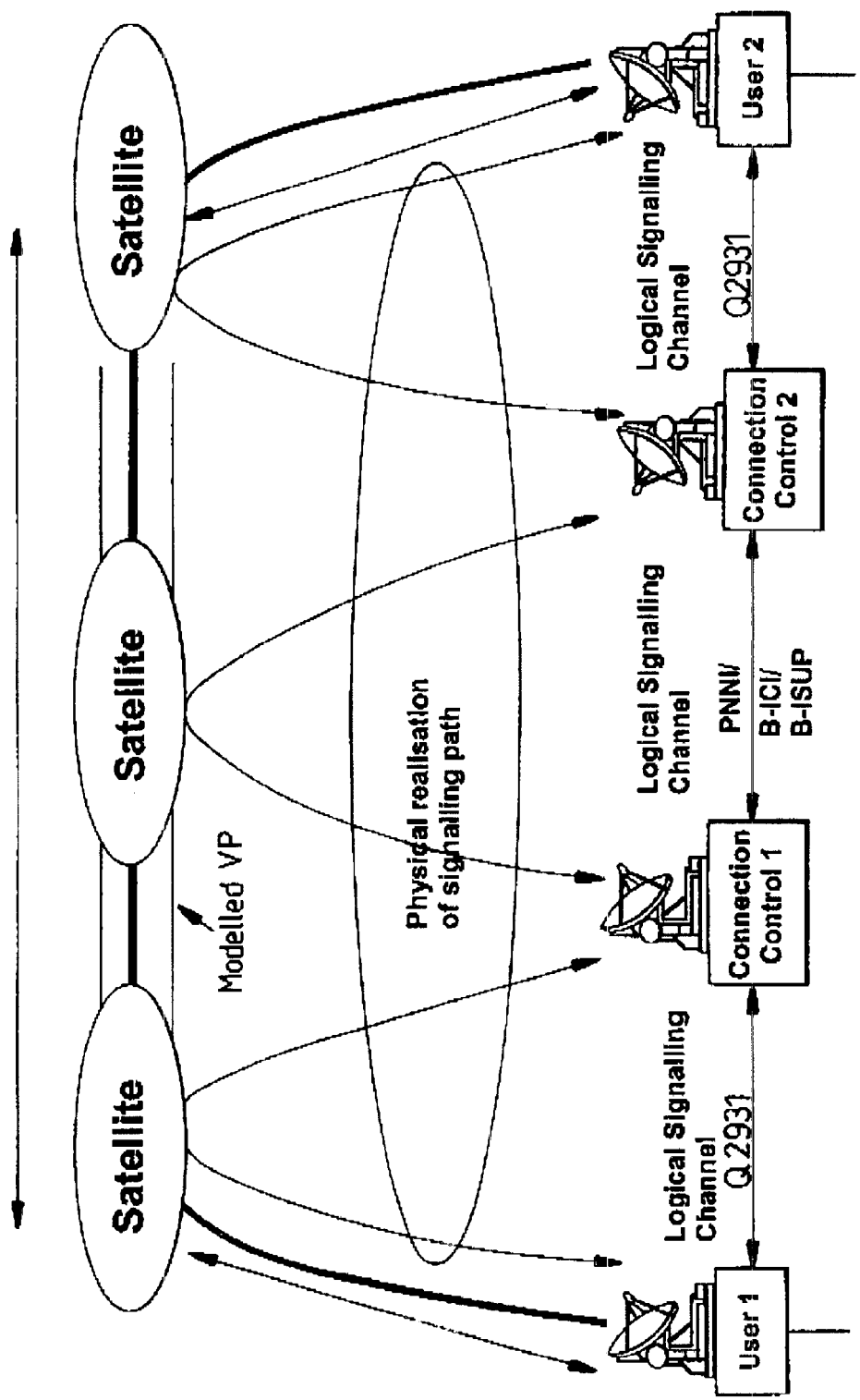
FIG. 9 illustrates the concept of a Virtual Virtual Circuit for handling traffic of QoS class 3 in the network of FIG. 1.

The preferred method illustrated in FIG. 9 to manage QoS class 3 traffic is by an effective maximum or mean bandwidth reservation end to end using the modelled virtual path concept. The network may reserve a certain effective bandwidth to meet some delay criteria, although not strictly necessary, and made available through a call admission control policy. With bandwidth reservation, flow control need only be performed locally at source. Bandwidth reservation could be performed at a VC level in terms of an individual session, or in the preferred embodiment at the modelled VP level, for which there would be sufficient aggregation of traffic. This effective bandwidth is maintained by full traffic shaping at source, and may be re-negotiated according to demand. Traffic shaping is implemented by the MAC protocol on the TDMA, which for QoS class 3 services operates a full or partial on-demand reservation service.

ATM ABR services therefore operate the flow control on an uplink access to the satellite network, but subsequently use the reserved bandwidth of the modelled VP in the core to ensure delivery. For TCP services that require QoS class 3, the access link flow control is combined with a virtual virtual Circuit (VVC), which is a virtual circuit in a stateless-connectionless network. The VVC is a model that describes a virtual circuit or community of interest between endpoints—there may be more than a pair—which is defined by a certain amount of bandwidth reservation that may be re-negotiated, and a persistence of state at the endpoints in the terminal equipment. The VVC may find application in LAN interconnect, VPN/EN Corporate Intranet and ISP to ISP applications.

Figure 10:
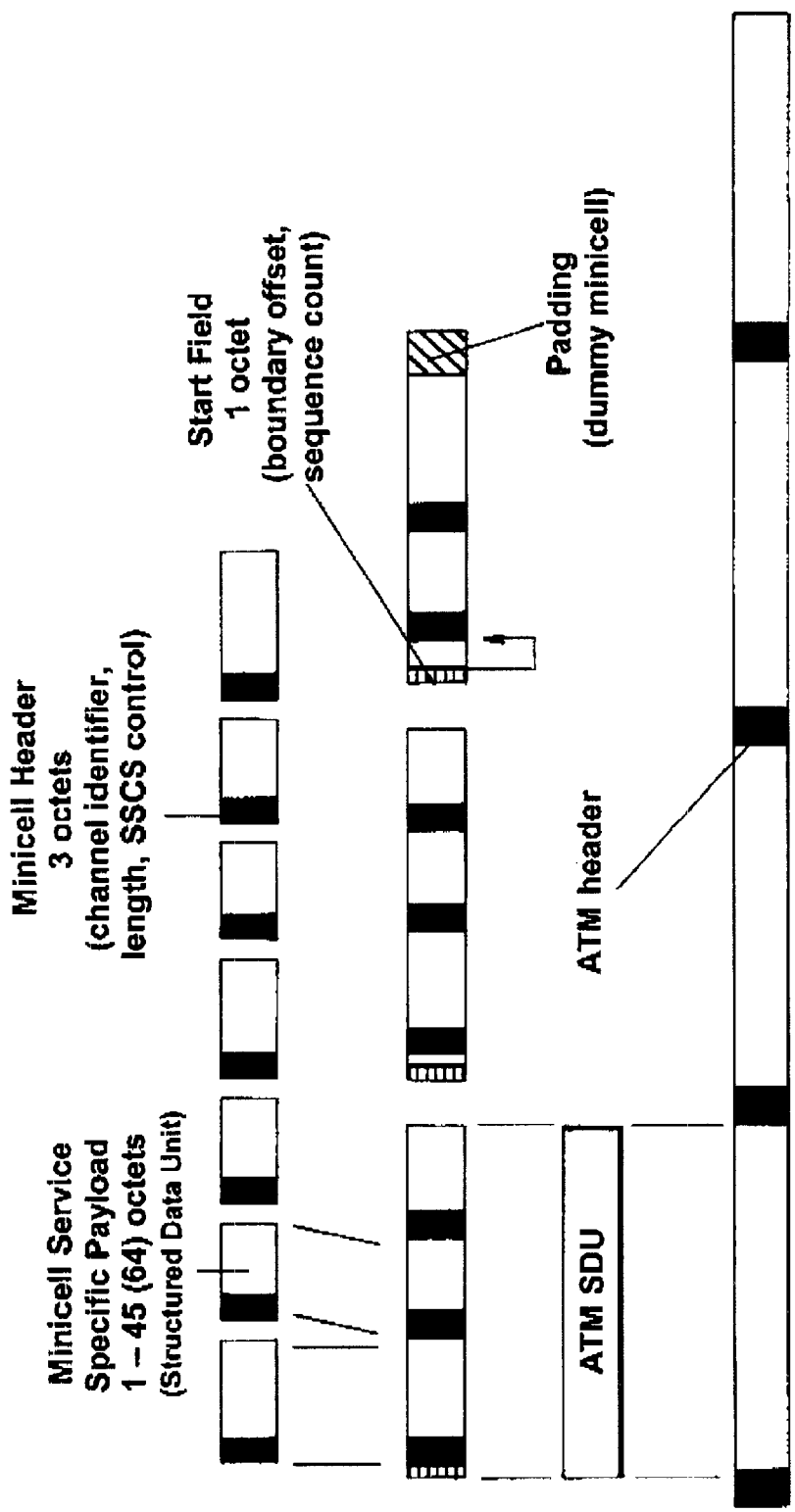
FIG. 10 illustrates the protocol of the AAL2 ATM adaptation layer.

A suitable ATM cell format in which AAL-2 minicells are multiplexed into ATM cells is illustrated by way of example in FIG. 10.

The VVC may be semi-permanent in which case it is configured, or it may be set-up on demand, i.e. signalled like a call. The VVC uses a lightweight protocol to establish individual sessions, and there may be several simultaneous sessions multiplexed in a given VVC. Traffic is transported by short variable length packets or in a preferred embodiment by the ITU AAL-2. The VVC persists longer than TCP or UDP sessions, such that it can provide a framework for routing connectionless (UDP) or connection-orientated sessions (TCP). This ensures that there is a defined routing policy between endpoints for these protocols, to manage congestion in the network. The AAL-2 Negotiation Procedures are a suitable lightweight protocol for establishing TCP sessions. The packets external to the network may be adapted to AAL-2 for transport in the network. A TCP session is then equivalent to an AAL-2 channel ID, and the TCP header could be dropped at the source network termination. UDP could keep its header and use an AAL-2 special reserved channel ID for all UDP transfers.

QoS class 4, can be assigned the lowest traffic priority such that it does not impinge on the other three QoS classes. The behaviour is then equivalent to the Internet best effort. However, the other three QoS classes are unaffected by the behaviour or the congestion of the fourth. They therefore provide the opportunity to handle applications according to there QoS requirements. QoS class 4 uses on-demand bandwidth on an uplink to a satellite network or a connectionless network using TDMA, and need not have any effective bandwidth reservation.

Capacity allocations are controlled by the call admission control, which for a stateless satellite network must be ground-based for QoS classes 1 and 2, and to cater for the effective bandwidth portion of class 3. It is not necessary to restrict the percentage capacity of classes 1 and 2 to any particular fixed values, except for functional constraints such as hand-off. By renegotiating a percentage capacity for the QoS classes individually, then different GoS can be achieved for each QoS.

Congestion management for QoS class 4 operates in sympathy with call admission control for QoS classes 1 and 2 and possibly class 3 traffic. Congestion management is equivalent to a function of IP routers that perform a dynamic controlled routing algorithm (e.g. OSPF) that updates the routing tables. Since CAC is ground-based, and congestion management's flow-control and advertising mechanisms would violate a stateless network criterion, then the congestion management needs to be ground-based and collocated. QoS class 4 traffic can be alternately routed in the network with reference to only local indications of congestion within a node and routing policy decisions made by the congestion management which either puts an explicit routing policy in each packet, or implicit destination based routing and context driven tables inside the nodes of the network.

QoS classes 1 and 2 have reserved bandwidth on a TDMA uplink, and in the core network. QoS class 3 may use a combination of reserved bandwidth or on-demand bandwidth on a TDMA uplink and effective bandwidth reservation in the core network. QoS class 4 operates only on-demand based bandwidth reservation on a TDMA uplink and has no a priori bandwidth reservation in the network operating on best effort principles. A satellite would not need to hand-off or retain a record of any bandwidth reservations. A ground based cell equipment can and keep this record, and as it is inherited by a physical node it can communicate this succinct information to the satellite. The satellite keeps running totals for the bandwidth reservations for the QoS classes separately and can use this to drive the on-demand allocations for the uplink.

It will be understood that the above description of a preferred embodiment is given by way of example only and that various modifications may be made by those skilled in the art without departing from the spirit and scope of the invention.

What is claimed is:

1. A method of controlling the admission of connection-orientated calls of different quality of service (QoS) traffic class requirements including a priority class and other classes of service, such that the admitted calls can be provided with predetermined grade of service (GoS) and QoS guarantees appropriate to their traffic class requirements, into a connection-less telecommunications packet network having a constantly changing topology and comprising a plurality of non-geostationary satellite nodes interconnected by inter-satellite communications links established between temporarily adjacent satellite nodes, and a ground network incorporating ground stations each being in communication with the respective satellite node currently nearest to that ground station, and in which each user of the network has an allocated signaling link to an allocated connection control, the method comprising; providing a virtual model of the network, said virtual model comprising an array of fixed virtual nodes corresponding to a current topological disposition of the satellite nodes and wherein each virtual node is connected to every other virtual node by a set of modelled virtual paths of predetermined capacity corresponding to current communications links within the real communications network, allocating capacity on said modelled virtual paths in response to connection requests from users so as to determine routing of those connections within the modelled network, restricting a routed connection for a priority class of service connection to a specific modelled virtual path for that connection on which modelled virtual path a quality of service appropriate to that connection can be guaranteed, and transferring that routed connection on the modelled virtual path from the virtual modeled network to the real network so as to admit the priority class of service connection to the real network.

2. A method as claimed in claim 1, and including combining reserved and on-demand bandwidth allocation to different traffic QoS classes in a network using TDMA access.

3. A method as claimed in claim 1, wherein said virtual network is used to define virtual virtual circuits corresponding to virtual circuits in the real network.

4. A method as claimed in claim 3, wherein said virtual virtual circuits are semi-permanent.

5. A method as claimed in claim 4, wherein connectionless traffic is aggregated and shaped to conform to stabilised distribution whereby to admit said connectionless traffic and manage that traffic in the network.

6. A method as claimed in claim 5, wherein traffic in of the higher quality of service classes is allocated reserved access bandwidth.

7. A method as claimed in claim 5, wherein traffic a lower of quality of service class is allocated on-demand access bandwidth.

8. A method as claimed in claim 1, wherein call state and admission control and congestion management are performed on the ground network.

* * * * *